US00RE37039E

(19) United States
(12) Reissued Patent
Biagiotti

(10) Patent Number: US RE37,039 E
(45) Date of Reissued Patent: Feb. 6, 2001

(54) APPARATUS FOR GLUEING THE TAIL OF A WEB TO A LOG FORMED OF THE WEB MATERIAL

(75) Inventor: Guglielmo Biagiotti, Lucca (IT)

(73) Assignee: Fabio Perini S.p.A., Lucca (IT)

(21) Appl. No.: 08/763,618

(22) Filed: Dec. 4, 1996

Related U.S. Patent Documents

Reissue of:
(64) Patent No.: 5,259,910
Issued: Nov. 9, 1993
Appl. No.: 07/780,199
Filed: Oct. 22, 1991

U.S. Applications:

(63) Continuation of application No. 08/506,548, filed on Jul. 25, 1995, now Pat. No. Re. 35,729.

(30) Foreign Application Priority Data

Oct. 17, 1990 (IT) ..... 9504 A/90

(51) Int. Cl.[7] ..... B65C 5/00; B64H 19/29
(52) U.S. Cl. ..... 156/456; 156/446; 156/578; 118/416
(58) Field of Search ..... 156/578, 456, 156/446, 457, 187, 191; 118/407, 410, 602, 264, 416

(56) References Cited

U.S. PATENT DOCUMENTS

| | | | | |
|---|---|---|---|---|
| 1,391,281 | | 9/1921 | Snyder | 118/407 |
| 2,192,453 | | 3/1940 | Rentsch | 119/407 |
| 2,357,476 | * | 9/1944 | Kaulen | 118/410 X |
| 3,113,884 | | 12/1963 | Kohler | 118/410 X |
| 3,511,693 | | 5/1970 | Davidson | 118/602 X |
| 3,554,641 | | 1/1971 | Jeffee et al. | 118/602 X |
| 3,789,794 | * | 2/1974 | Smith | 118/602 X |
| 4,026,752 | * | 5/1977 | Hartbauer | 156/578 X |
| 4,102,304 | | 7/1978 | Debenham | 118/410 X |
| 4,695,482 | | 9/1987 | Weiswurm . | |
| 4,708,629 | * | 11/1987 | Kasamatsu | 118/410 X |
| 4,938,835 | | 7/1990 | Ludwig | 156/578 X |
| 4,963,223 | * | 10/1990 | Biagotti | 156/456 |
| 5,033,403 | | 7/1991 | Mladota | 118/410 X |

FOREIGN PATENT DOCUMENTS

| | | | |
|---|---|---|---|
| 2606674 | 11/1987 | (FR) . | |
| 1434941 | 5/1976 | (GB) . | |
| 1497662 | 1/1978 | (GB) . | |
| 0035562 * | 11/1975 | (JP) | 156/357 |

* cited by examiner

*Primary Examiner*—James Engel
(74) *Attorney, Agent, or Firm*—Breiner & Breiner

(57) ABSTRACT

An apparatus for glueing the tail or outer end of a web of material which has been formed into a log which comprises: device (9, 13) for unwinding the tail from the log (R); applicator (45) for applying glue to the log; tail rolls (97, 99) for re-winding the tail back on the log and glueing the tail to the log; and conveyor (23, 41) for transferring said log. The applicator for applying the glue includes a dispenser device (55–63) provided with a nozzle (61) forming at least one upwardly oriented slit (63) from which the glue is dispensed by overflowing; the log (R) conveyor (23, 41) discharges the log, with the tail (L) being unwound from it, above the glue dispenser, causing it to roll over said slit (63) for the application of the glue to the log.

9 Claims, 5 Drawing Sheets

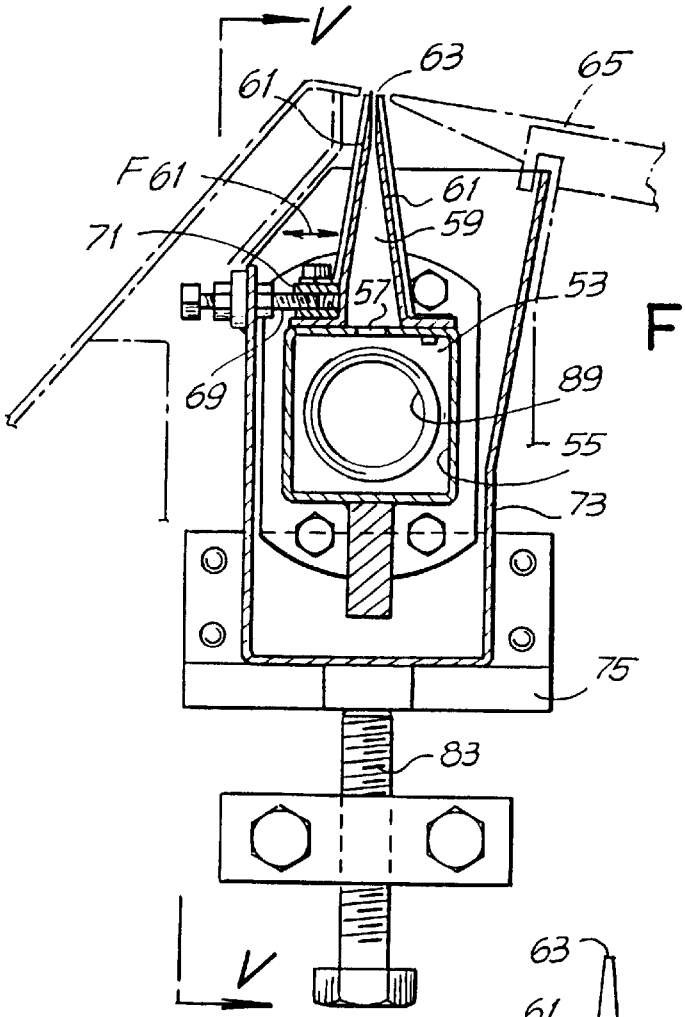
Fig. 4
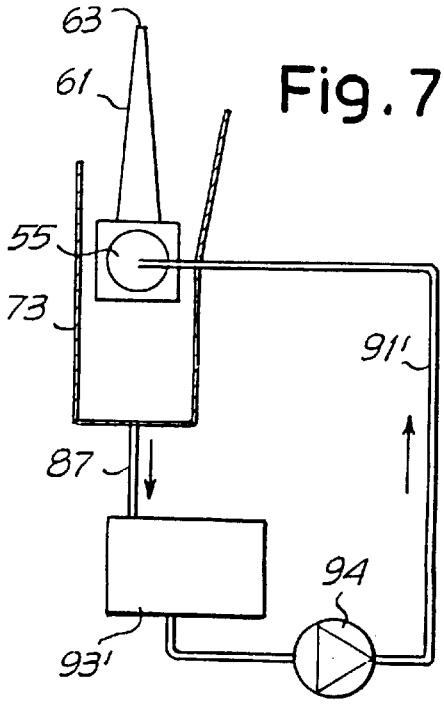
Fig. 7
Fig. 6
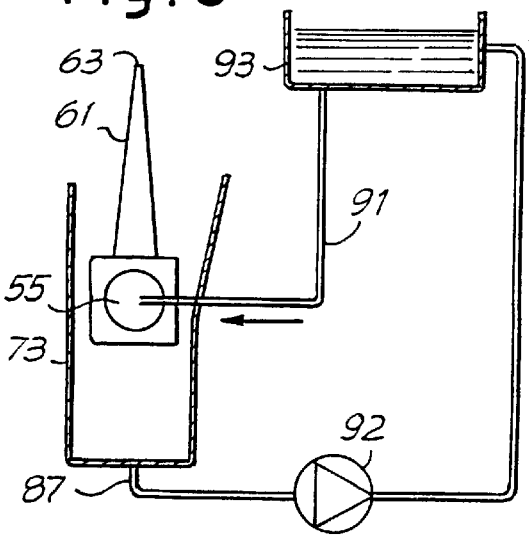

APPARATUS FOR GLUEING THE TAIL OF A WEB TO A LOG FORMED OF THE WEB MATERIAL

Matter enclosed in heavy brackets [ ] appears in the original patent but forms no part of this reissue specification; matter printed in italics indicates the additions made by reissue.

*This is a continuation of Reissue application Ser. No. 08/506,548, filed Jul. 25, 1995, now RE 35729, which is a reissue of application Ser. No. 07/780,199, filed Oct. 22, 1991, now U.S. Pat. No. 5,259,910.*

The invention refers to an apparatus for glueing the tail or outer end of a web material wound to form a roll or log. It includes means for unwinding the tail of the web of the material from a log; means for applying glue to the log; means for re-winding the tail on to the log and glueing it thereto; and means for transferring said log.

BACKGROUND OF THE INVENTION

A winding apparatus of this general type is described in U.S. Pat. No. 4,475,974. That apparatus comprises chain means which support pairs of bearing rollers. The logs to be glued are disposed on these bearing rollers. Each roll or log is transported by means of a conveyor member through a first station in which the tail or outer end of the web is unwound from the log and laid down onto a flat surface. At a second station a nozzle, moving parallel to the axis of the log, applies glue to the end of the unwound material. At a third station, the log is rotated between the two bearing rollers so as to wrap the outer end and back onto the log and thus glue it to the outer surface of the log. Located downstream of these stations are log-pressing and closing rollers and a discharge surface. This apparatus makes it possible to attain high outputs per hour in that, at each instant, three logs are processed at the same time in the three stations for the unwinding, glueing and closing of the log, respectively. However, this type of glue applicator has a rather complex and costly structure.

It is an object of the invention to provide an apparatus of the above-mentioned type which makes it possible to reach high outputs per hour with an extremely simple construction and with a limited number of movable parts.

DESCRIPTION OF THE INVENTION

In the apparatus of the present invention, the means for applying the glue includes a dispenser device having means forming an upwardly oriented slit from which the glue is delivered by overflowing. The log transferring means discharges said log, with the tail unwound therefrom, causing it to roll over the slit while said tail is unwrapped from the log. Said slit may be of any shape. Moreover, a plurality of adjacent slits may also be provided.

In a particularly advantageous embodiment, the slit extends in a direction substantially parallel to the log axis at least for a portion of the length of the log.

With such arrangement when the log is discharged, it rolls across a guide surface and, during rolling, it passes over the slit from which the glue is continuously (or discontinuously) supplied, so that, at a predetermined location of the log surface, a strip of glue having a pattern the same as the dispensing slit is applied thereon. As the log continues to roll, the tail is automatically rewound over the log and pressed against the log where the glue has been applied. The glueing occurs therefore extremely swiftly and without the need for dispensing nozzles moving longitudinally along the log, as in prior machines. In fact, by the simple rolling of the log over the slit, the glue is applied along the entire length of the log. Gravity, which causes the rolling of the log, causes the subsequent re-wrapping of the tail.

To transfer the log from the tail-unwinding station to the glue-application station, a flexible conveyor may be provided, which includes a bearing means on which the log is supported. The bearing means may be made to oscillate to discharge the log at a predetermined position onto an inclined table which has an opening aligned with the slit of the glue dispenser device. In practice, the conveyor member may be a pair of parallel chains between which one or more cradles are disposed, pendulum-like, and pivoted to the said conveyor.

Along the path of the conveyor, a guide means is also provided to cause the cradle to oscillate about the axis on which the latter is pivoted to the conveyor, thereby causing the discharge of the log when the cradle passes a predetermined point along the same guide means. In this way, no separate pusher is necessary to discharge the log from the conveyor because it is the motion of the conveyor which causes the oscillation of the cradle and thus the discharge of the log.

In a particularly advantageous embodiment, the glue-dispensing device may comprise a container, especially a tubular container, extending transversely to the movement of the log within the apparatus, said container being provided with means defining the glue-dispensing slit and further connected to means for the supply of the glue. Disposed under the tubular container is a tank for collecting the glue which overflows from the said slit. A conduit is provided in the bottom of the tank for recovering the excess glue.

Advantageously, said container may be connected to a glue reservoir in which the glue level is maintained above the height of the dispensing slit. In this way, a continuous flow of glue from the reservoir to the container, and from the latter to the dispensing slit, is obtained. The glue flow rate is determined by the difference in height between the glue surface within the reservoir and the dispenser slit by the pressure loss along the glue path, by the glue viscosity, and by the slit dimensions.

This type of supply has the advantage of not requiring a controlled dispensing means, such as a pump and a nozzle and, moreover, it allows a continuous and easily adjustable flow of glue from the reservoir to the slit, while the excess of glue overflowing from the slit, which is not picked up by the logs rolling over the same slit, is collected in the underlying tank from which it can be easily recovered and made to flow back into the upper reservoir. This avoids the drawbacks exhibited by the nozzle-type dispensing means which, when the apparatus is stopped even for short periods, are clogged up by the drying of the glue, thus making it difficult to re-start the apparatus. With a continuous flow of glue, as obtained through the dispenser of the present invention, there is no undesirable drying of glue during short pauses of the apparatus, since the supply is not interrupted and the glue remains in circulation.

In a distinctively advantageous embodiment of the invention, the means for unwinding the tail of the log consist of a pair of cylinders rotating about fixed axes and combined with a suction box having a surface on which the unwound tail is made to rest. Contrary to the apparatus of known type, therefore, only one unwinding station is provided in this case which station remains in a fixed position with respect to the machine frame while the log, with the tail already unwound, is picked up from the said station by the above-described conveyor.

The invention also refers to a method for glueing the tail of a log formed of web material onto the log itself, wherein: the glue is applied on an area of the web material which is still wound up on the log (and not on the unwound tail), by making said log roll with its tail being unwound, over the glue-dispensing slit.

The invention further refers to a glue dispenser, mostly for use in an apparatus for glueing the tail of logs or rolls of web material, comprising a tubular container provided with means defining a slit from which the glue is dispensed, and means for feeding the glue to said tubular container. A storage tank may be provided below the container to collect the glue overflowing from said slit. Advantageously the storage tank may be connected to a glue reservoir into which the glue collected by said tank is re-admitted to let it into the tubular container afterwards. Said reservoir may be located at such a height that the difference between the level of glue inside the reservoir and the height of the dispenser slit will allow the glue to flow through the latter.

DETAILED DESCRIPTION

The invention will be better understood by following the description and the attached drawing, which shows a feasible, not limiting, embodiment of the same invention. In the drawing:

FIG. 4 shows a cross-section view of the glue dispenser.

FIGS. 6 and 7 are schematic views of two embodiments of the glue dispenser system.

Figure 1:
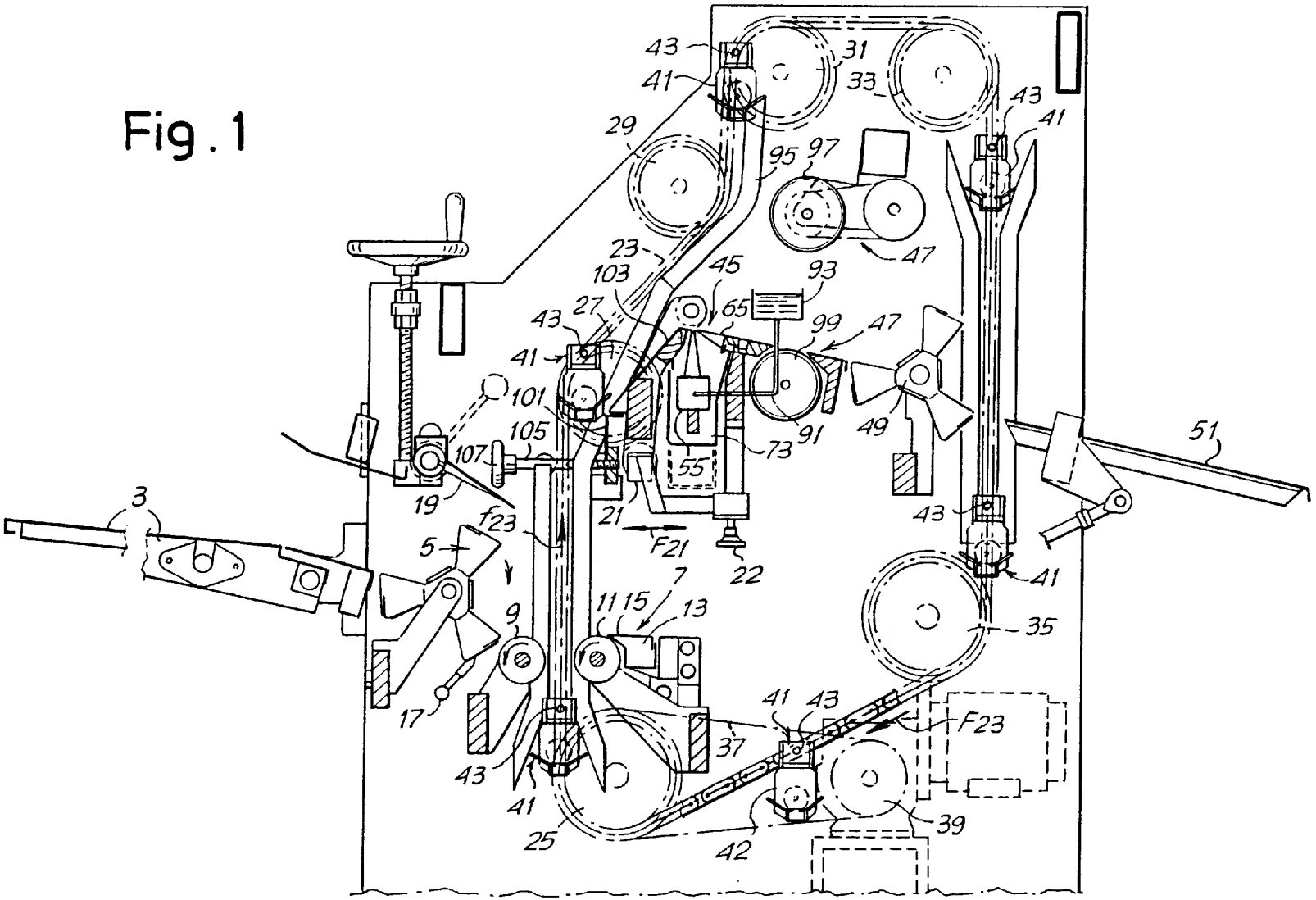
FIG. 1 shows an ensemble side view of the apparatus according to the invention.

With reference to FIG. 1, the apparatus according to the invention comprises an inclined surface 3 on which the logs of web material roll when they are discharged from an upstream-located rewinder, not shown. Downstream of the inclined surface 3 is a rotating wheel 5 which transfers the rolls coming from the surface 3 to the next station, generally designated 7, for the unwind of the tail L.

The station for the unwinding of the log tail comprises a pair of cylinders 9 and 11 rotating about fixed axes in a direction indicated by the arrows in the Figure. Associated with the cylinder 11 is a suction box 13 with a surface 15 on which, during the unwinding operation, the tail of the log, being discharged on the cylinders 9 and 11, is laid. Associated with the unwinding station 7 are nozzles 17, 19 from which air jets facilitate the unwinding of the tail from the log on the surface 15.

A sensor 21 disposed above the surface 15 and schematically represented in the Figure detects the position of the tail on the bearing surface 15. Said sensor 21 is mounted by means of a knob 22 and a slot, as as to be easily moved in the direction of the double arrow f21. Moving the sensor 21 makes it possible to adjust the length of the unwound tail and thus the position of the line of glue with respect to the tail of the web material. The unwinding station operates substantially in a manner similar to that described in the cited U.S. Pat. No. 4,475,974 and, therefore, will not be described in greater detail.

The apparatus further comprises a conveyor 23 which may be a pair of chains parallel to each other and disposed one on either side of the machine, only one of them being indicated in dotted line in FIG. 1. The conveyor 23 is driven by a series of wheels or pulleys 25, 27, 29, 31, 33 and 35. The wheels 25 to 35 define a path of the conveyor 23 for the purposes indicated below. In the example shown, the wheel 25 is driven into rotation through a belt or chain 37, by a motor or motor-reducer 39, and transmits the motion to the other wheels.

Cradles 41 pivotally connected to the conveyor 23 are provided for supporting the log. In the example shown in FIG. 1, six cradles 41 are provided, each of which is pendulum-like pivoted to the conveyor 23. In practice, each cradle 41 consists of a transverse beam 40 connected at its ends to two small side boards 42 swingingly pivoted at 43 to the respective conveyor 23. Each beam 40 carries a plurality of V-shaped troughs 44 which form the teeth of a comb-like structure. The cylinders 9, 11 are provided with corresponding annular slots to allow the passage of the V-shaped troughs 44, for the purposes to be indicated below.

An applicator generally designated 45 is disposed above the unwinding station 7 for applying the glue to the log and downstream of said applicator additional means 47 are disposed for pressing the tail, now rewound, against the log, and fixing it onto the latter. Disposed downstream of means 47 is a wheel 49 which discharges the logs, one after the other, onto an inclined plane 51 to feed them to further work cycles. The wheel 49 is synchronized with the motion of the conveyor 23, and thus of the cradles 41, to discharge the logs R onto the inclined plane 51, when no cradle is passing through the discharge region of the wheel 49. In practice, the wheel 49 discharges at such a frequency as to avoid the accumulation of rolls after the glueing station.

Figure 5:
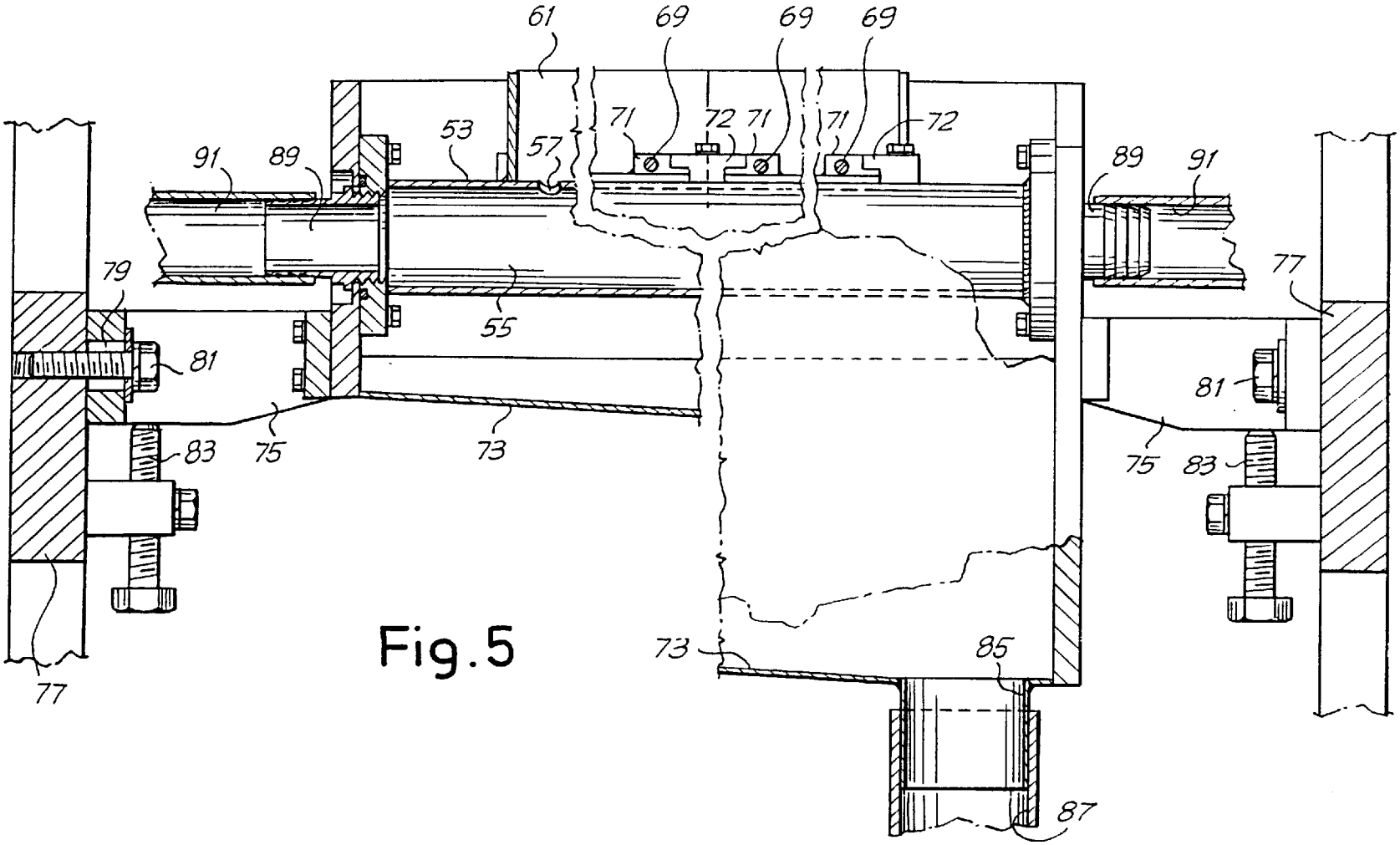
FIG. 5 shows a section taken on line V—V of FIG. 4.

The glue-applying means 45 are shown in detail in FIGS. 4 and 5. Substantially, these means comprise a dispenser 53 made up of a tubular-shaped container 55 which has a square cross-section and is provided with holes 57 on top. The holes 57 of the tubular container 55 lead into a wedge-shaped spout 59 formed by a pair of inclined plates 61 which define at their top a slit 63 from which the glue is delivered. The slit 63 is disposed in alignment with a log or roll rolling surface 65 for the application of the glue in a manner to be described later on. The position of the slit 63 with respect to the surface 65 can be seen in detail in FIGS. 3 and 4, wherein the dispenser device 53 is schematically represented. As shown in particular in FIG. 4, one of the two plates 61 is fixed on the tubular container 55, while the other may be adjusted in position in the direction of arrow f61 by means of a series of set screws 69 which engage into bushes 71 fixed to the relevant plate 61. Shapes 72 (FIG. 5) are provided to guide the motion of the plate 61 during adjustment.

The tubular container 55 extends throughout the width of the apparatus, while the slit 63, defined by the plates 61, extends to an extent approximately equal to the axial development of the logs to be glued.

Disposed beneath the tubular container 55 is a storage tank 73 mounted by brackets 75 to the sides 77 (FIG. 5) of the apparatus. The brackets 75 are provided with slots 79 for the passage of screw means 81 therethrough; said screw means are provided for a clamping engagement to the machine frame allowing the assembly made up of tank 73, container 55 and plates 61 to be adjusted in height. The adjustment is carried out by means of set screws 83. The tank 73 has a laterally (to the right in FIG. 5) inclined bottom and is provided with a pipe fitting 85 at the lowest point thereof for connection to a conduit 87 from which the glue collected within the tank 73 is taken out and made to re-circulate in a manner to be described later on.

Conduits 91 are joined to the tubular container 55 for the inflow of glue inside the said tubular container 55. The glue is drawn out through the conduits 91 from a reservoir 93, schematically shown in FIG. 1, in which the glue surface reaches a level higher than the slit 63 defined by plates 61 fixed to the tubular container 55. In this way, the glue contained in the reservoir 93 may flow through the conduits 91 into the tubular container 55 and come out by overflowing from the slit 61 because of the difference in height between the glue surface inside the reservoir 93 and the feeding slit 63. The flow rate of glue may be easily adjusted by varying the difference in height. Advantageously, the glue is made to flow continuously, and the excess of the glue overflowing or overfalling from the slit 63, and which is not applied to the log as described later on, collects in the underlying storage tank 73 to be recovered through the conduit 87 and re-circulated into the reservoir 93 by a suitable pumping means. The arrangement of reservoir 93 and conduit 91 with respect to the glue-feeding device is also schematically depicted in FIG. 6 which shows a glue-recirculating pump 92.

The delivery of glue may also take place in a different way, with an arrangement of the type shown in FIG. 7. In this embodiment, the glue reservoir, designated 93', is disposed at a lower level with respect to the delivery slit 63 and to the tubular container 55. The excess of glue collected in the tank 73 is directly introduced into the reservoir 93' through the conduit 87. From this reservoir, the glue is drawn out by a constantflow rate pump 94, to be fed into the tubular container 55 via the conduit 91'.

The above-described apparatus operates as follows. The roll or log coming from a rewinder located upstream of the described apparatus is made to roll onto the inclined surface 3 and transferred by the wheel 5 to the cylinders 9 and 11 which, as described for example in the cited U.S. Pat. No. 4,475,974, provide for unwinding a portion of the tail (free end) to lay it down onto the surface 15 of the suction box 13 with the aid of the nozzles 17, 19 and of sensor 21 which stops the rotation of cylinders 9, 11 the moment the free unwound end reaches a pre-determined position on the surface 15.

At this point, the conveyor 23, which moves in the direction of arrow f23, brings one of the cradles 41 below the log supported by the cylinders 9 and 11 and raises it up towards the glueapplying means generally indicated by 45. As shown in particular in FIG. 2, when the log R is lifted from the cylinders 9 and 11 by means of the cradles 41, its tail end L hangs freely downwards. Along the path of the conveyor 23, a guide surface 95 is disposed which drives the cradles 41 into oscillation when these arrive at the height of the surface 65 for discharging the log R onto the said surface 65.

Figure 3:
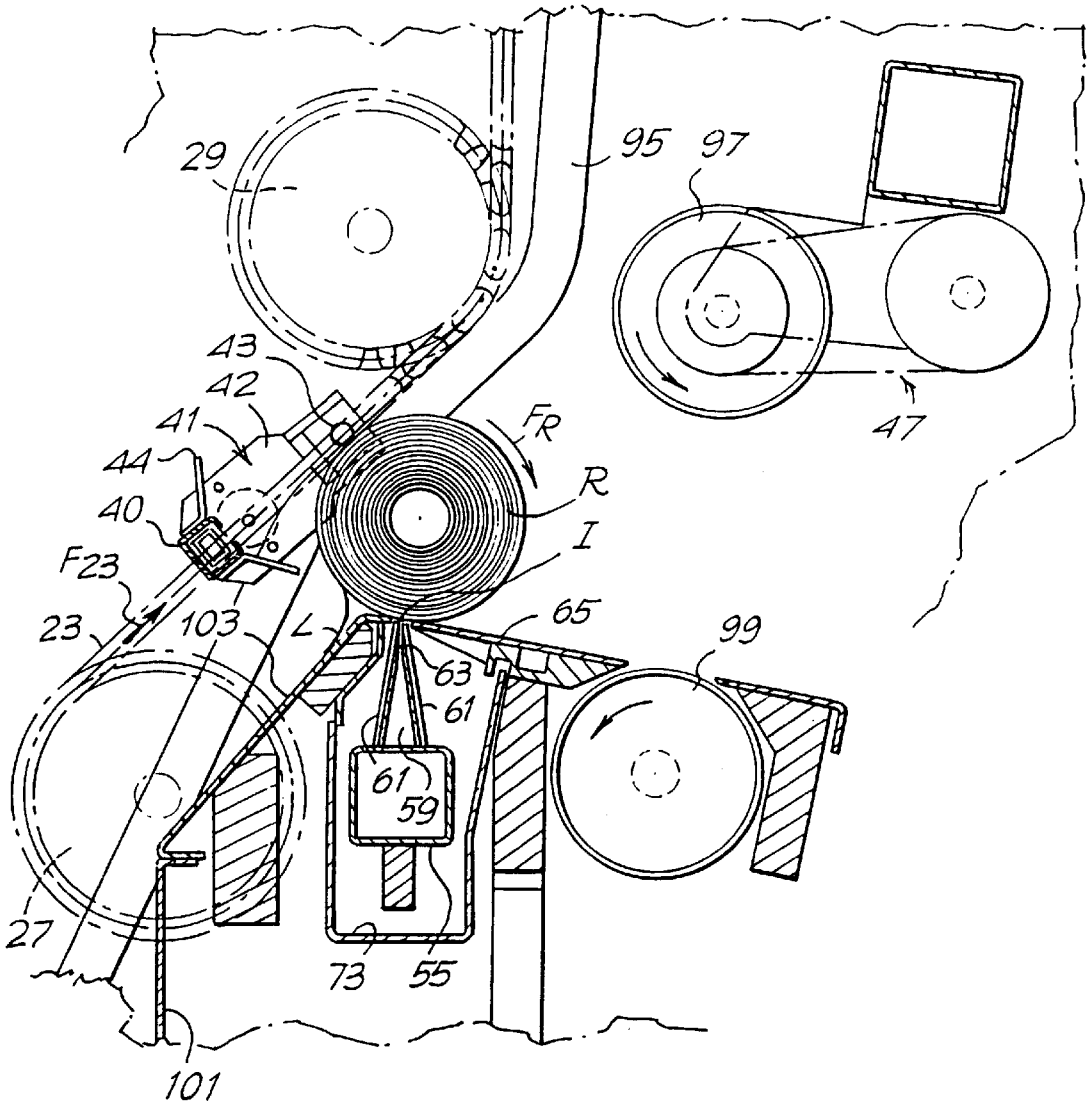
FIG. 3 shows an enlarged side view of the glue application region.

The log-discharge phase is shown in particular in FIG. 3. the position for the discharge of log R onto the surface 65 is so determined that, when the log begins to roll over the said surface 65, it comes in contact with the slit 63, defined by the plates 61, at the position where the tail is to be glued. Accordingly, when the log R begins to roll on the surface 65, as shown in FIG. 3, it comes in contact with the slit 63 and has applied thereto, in the region I, an amount of glue sufficient to allow the subsequent anchorage of the tail L which is re-wound onto the log body as the latter continues to roll downwardly in the direction of arrow fR along the surface 65.

Disposed at a suitable distance from the slit 63, two cylinders 97, 99 are part of the log-closing means 47. The space between the rollers 97, 99 is such that, when the log passes between then, the log itself is radially compressed to receive the tail L onto the log. To this end, both cylinders 97, 99 are motor-driven and are rotated at slightly different peripheral speeds. The difference between the peripheral speeds is such as to rotate the log through one or two revolutions during its transit between the cylinders 97, 99.

The thus-closed log is discharged, as already described, onto the discharge plane 51 by means of wheel 49.

For the above-described apparatus to work properly, it is evident that the tail L of log R must be folded downwards when the log is discharged from the conveyor onto the surface 65 and passes over the glue-feeding slit 63. If the wound material is sufficiently flexible, the tail L places itself spontaneously in the position shown in FIG. 2. However, in some cases, and when the material wound up on the log R is thicker and stiffer, it may be necessary to provide means ensuring the correct position of the log tail prior to the discharge of the log onto the surface 65. In the example shown in FIGS. 1 and 2, this is achieved by means of a surface formed by a first, substantially vertical plate 101, and of a second, inclined plate 103. The plate 101 can be adjusted by means of screw means 105 and a handwheel 107 to take up such a position, with respect to the log in transit, as to always ensure (also in case of varying log diameter) that the tail L of the log is folded downwards. When the log R is discharged as shown in FIG. 3, the tail L rests on the inclined plate 103 and slides over it upwards while the log R rolls along the surface 65.

Figure 2:
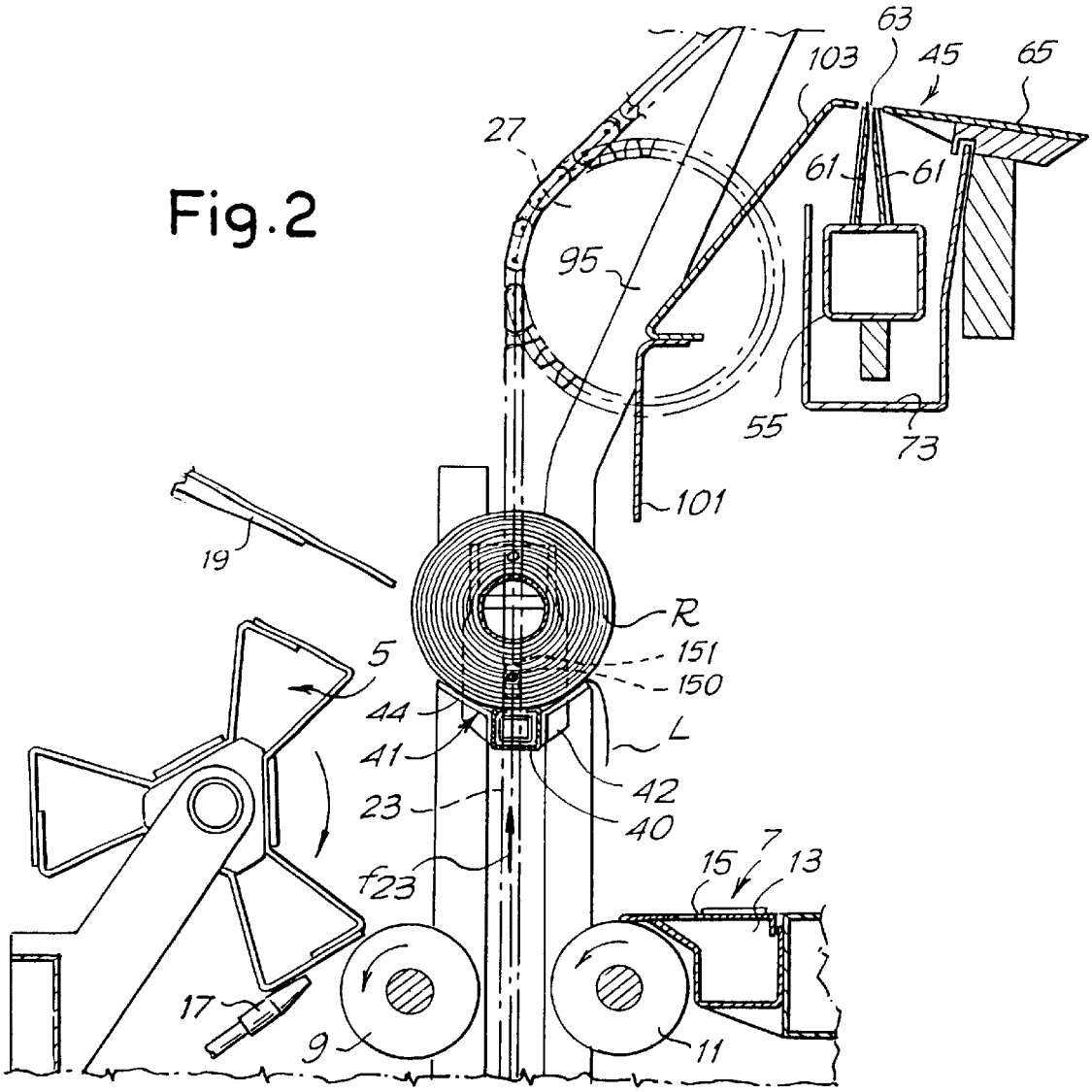
FIG. 2 is an enlarged detail of the tail unwinding region.

Even though in the above-described embodiment guide means 95 are provided outside the conveyor 23 for causing oscillation of the cradles 41, in a modified embodiment it is possible to omit these guide means and replace them with guide means incorporated in the cradles themselves. For example, the side boards 42 of each cradle 41 can be connected to the relevant conveyor 23 not only with a pivot at 43, but also with a further pivot 150 engaging in a slit 151 of the side board itself. Such a slot 151 is shown in FIG. 2. If the first pivot 43 and the further pivot 150 engaging in the slot are connected to two different links of a chain forming the conveyor member 23, than a change in direction of the conveyor 23, such as the one caused by pulleys 27, 29, causes an oscillation of the side boards and thus of the cradles 41 connected to the conveyor. In this way, oscillation of the cradle 41 and discharge of the log is achieved without external guides 95, these being omitted by the guide formed by the pivot and slot arrangement in the flexible member and the side boards.

Further modifications of the above-described apparatus are possible. E.g. wheel 49 can be omitted and cylinders 97, 99 can be synchronized with the movements of the cradles 41. As stated above, each log R is kept for a while between cylinders 97, 99, in order to seal the tail to the log. This is obtained by keeping the peripheral speeds of cylinders 97 and 99 at the same value for a while. Thereafter, cylinder 97 is allowed to rotate faster than cylinder 99, thus causing the closed log R to further roll toward the inclined surface 51. If the rotational speeds of cylinders 97 and 99 are made to vary in synchronism with the passage of cradles 41 in front thereof, the wheel 49 can be omitted, since distribution of the logs is achieved by suitably controlling the rotational speeds of cylinders 97, 99, e.g., by means of a central processing unit (not shown) or other suitable means.

It is understood that the drawing shows an exemplification given only as a practical demonstration of the invention, as this may vary in the forms and dispositions without nevertheless coming out from the scope of the idea on which the same invention is based. The possible presence of reference numbers in the appended claims has the purpose of facilitating the reading of the claims, reference being made to the description and the drawing, and does not limit the scope of the protection represented by the claims.

Having thus described my invention, what is claimed as new and desired to protect by Letters Patent are the following:

[1. An apparatus for glueing the outer end of a web material forming a roll or log including:

conveyor means (23) which lifts the roll or log vertically from a lower unwind position to an upper glue applying position, roller means for rotating the roll or log as it travels vertically on the conveyor means whereby to unwind the outer end of the material wound up to form a log, transport means on which the roll or log travels from the conveyor with the outer end of the material following behind the roll or log, means for applying glue on a portion of the web material still wound on the log in advance of the trailing outer end, means for rewinding the outer end so that said glue serves to adhere the said outer end to the log, means for transferring said log, said means for applying the glue comprising a dispenser device (55–63) having means (61) which form at least an upwardly oriented slit (63) from which the glue is dispensed by overflowing, said log (R) conveyor means (23, 41) arranged to discharge the log, with the outer end (L) unwound therefrom, thereby causing the log to roll over said slit (63).]

[2. An apparatus for glueing the outer end of a web material forming a roll or log including:

conveyor means (23) which lifts the roll or log vertically from a lower unwind position to an upper glue applying position, roller means for rotating the roll or log as it travels vertically on the conveyor means whereby to unwind the outer end of the material wound up to form a log, transport means on which the roll or log travels from the conveyor with the outer end of the material following behind the roll or log, means for applying glue on a portion of the web material still wound on the log in advance of the trailing outer end, means for rewinding the outer end so that said glue serves to adhere the said outer end of the log, means for transferring said log, said means for applying the glue comprising a dispenser device (55–63) having means (61) which form at least an upwardly oriented slit (63) from which the glue is dispensed by overflowing, said log (R) conveyor means (23, 41) arranged to discharge the log, with the outer end (L) unwound therefrom, thereby causing the log to roll over said slit (63), said slit (63) extending in a direction substantially parallel to the axis of the log (R) for at least a portion of the length of the log.]

[3. An apparatus for glueing the outer end of a web material forming a roll or log including:

conveyor means (23) which lifts the roll or log vertically from a lower unwind position to an upper glue applying position, roller means for rotating the roll or log as it travels vertically on the conveyor means whereby to unwind the outer end of the material wound up to form a log, transport means on which the roll or log travels from the conveyor with the outer end of the material following behind the roll or log, means for applying glue on a portion of the web material still wound on the log in advance of the trailing outer end, means for rewinding the outer end so that said glue serves to adhere the said outer end to the log, means for transferring said log, said means for applying the glue comprising a dispenser device (55–63) having means (61) which form at least an upwardly oriented slit (63) from which the glue is dispensed by overflowing, said log (R) conveyor means (23, 41) arranged to discharge the log, with the outer end (L) unwound therefrom, thereby causing the log to roll over said slit (63), the log (R) transferring means comprising a conveyor (23) having at least a log (R) bearing means (41, 43) which can oscillate to discharge the log (R) onto an inclined surface (65), said inclined surface having an aperture in alignment with the slit (63) of the dispenser device (55–63).]

[4. An apparatus for glueing the outer rend of a web material forming a roll or log including:

conveyor means (23) which lifts the roll or log vertically from a lower unwind position to an upper glue applying position, roller means for rotating the roll or log as it travels vertically on the conveyor means whereby to unwind the outer end of the material wound up to form a log, transport means on which the roll or log travels from the conveyor with the outer end of the material following behind the roll or log, means for applying glue on a portion of the web material still wound on the log in advance of the trailing outer end, means for rewinding the outer end so that said glue serves to adhere the said outer end to the log, means for transferring said log, said means for applying the glue comprising a dispenser device (55–63) having means (61) which form at least an upwardly oriented slit (63) from which the glue is dispensed by overflowing, said log (R) conveyor means (23, 41) arranged to discharge the log, with the outer and (L) unwound therefrom, thereby causing the log to roll over said slit (63), said slit (63) extending in a direction substantially parallel to the axis of the log (R) for at least a portion of the length of the log, the log (R) transferring means comprising a conveyor (23) having at least a log (R) bearing means (41, 43) which can oscillate to discharge the log (R) onto an inclined surface (65), said inclined surface having an aperture in alignment with the slit (63) of the dispenser device (55–63).]

[5. An apparatus for glueing the outer end of a web material forming a roll or log including:

conveyor means (23) which lifts the roll or log vertically from a lower unwind position to an upper glue applying position, roller means for rotating the roll or log as it travels vertically on the conveyor means whereby to unwind the outer end of the material wound up to form a log, transport means on which the roll or log travels from the conveyor with the outer end of the material following behind the roll or log, means for applying glue on a portion of the web material still wound on the log in advance of the trailing outer end, means for rewinding the outer end so that said glue serves to adhere the said outer end to the log, means for transferring said log, said means for applying the glue comprising a dispenser device (55–63) having means (61) which form at least an upwardly oriented slit (63) from which the glue is dispensed by overflowing, said log (R) conveyor means (23, 41) arranged to discharge the log, with the outer end (L) unwound therefrom, thereby causing the log to roll over said slit (63), the log (R) transferring means comprising a conveyor (23) having at least a log (R) bearing means (41, 43) which can oscillate to discharge the log (R) onto an inclined surface (65), said inclined surface having an aperture in alignment with the slit (63) of the dispenser device (55–63), said bearing means (41, 43) being a cradle which is pivoted to said conveyor (23), and including a guide means (95) able to cause the cradle to oscillate about an axis (43) on which it is pivoted to the conveyor, thereby causing the discharge of the log (R) when the cradle passes a pre-determined position of its path.]

[6. An apparatus according to claim 1 characterized in that said dispenser device (55–63) comprises a container (55) provided with means (61) which define said slit (63) and which is connected to glue-feeding means (91), a tank (73) disposed below said container (55) for collecting the glue overflowing from said slit (63), and a conduit (87) for recovering glue from said tank (73).]

[7. An apparatus according to claim 6, characterized in that the container (55) is provided with means (61) defining said slit (63), connected to a glue reservoir (93), wherein the glue level is maintained above said slit (63), and the glue is dispensed by free fall.]

[8. An apparatus according to claim 6 characterized in that the conduit (87) for the collection of glue from said tank (73) re-circulates the glue, through suitable means (92), into the glue reservoir (93).]

[9. An apparatus according to claim 6 characterized in that the container (55) is provided with means (61) defining said slit (63) connected to a glue reservoir (93') located below the slit (63), and that a constant-flowrate pump (94) moves the glue from said reservoir (93') into said container (55).]

[10. An apparatus according to claim 1 characterized in that the dispenser device (55–63) is provided with means (83) for adjusting the position of the slit (61) from which the glue is fed.]

[11. An apparatus according to claim 1 characterized in that the dispenser device (55–63) is provided with means (69, 71, 72) for adjusting the width of the slit (63) from which the glue is fed.]

[12. An apparatus according to claim 1 characterized in that along the path of the log (R), a surface (101, 103) is disposed between the outer end (L) unwinding means (7) and the glue-applying means (45) to divert the outer end (L) unwound from the log (R).]

[13. An apparatus according to claim 1 characterized in that the means (7) for unwinding the outer end of the log (R) are disposed in a fixed position with respect to the apparatus frame.]

[14. An apparatus according to claim 13 characterized in that the means (7) for unwinding the outer end (L) of the log (R) comprise a pair of cylinders (9, 11), each rotating about a respective fixed axis, on which the log (R) is made to rest, and a stationary suction box (13) with a surface (15) on which the unwound outer end (L) is laid down, said log conveyor (23, 41) picking up the log from said rotating cylinders (9, 11).]

[15. An apparatus according to claim 14, including a sensor (21) which is located in an adjustable position near said fixed surface (15) to detect the position of the unwound outer end (L) and stop the rotation of the cylinders (9, 11) when said outer end is unwound a pre-determined length.]

[16. An apparatus according to claim 1 characterized in that said means (47) for rewinding the log and adhering the outer end (L) comprise two cylinders (97, 99) rotating at slightly different peripheral speeds to cause the log (R), in transit between said two rollers, to rotate about its own axis.]

*17. A glue applicator comprising (a) tubular container provided with means defining an upwardly oriented longitudinally extending slit from which glue is dispensed, (b) means for continuously feeding glue to said tubular container and thus to said slit so that the glue is caused to continuously overflow from said upwardly oriented slit wherein said means comprises (1) a storage tank located beneath the tubular container to collect excess glue continuously overflowing from said upwardly oriented longitudinally extending slit and (2) recirculating means for recirculating said excess glue from said storage tank to said tubular container, (c) a surface aligned with said slit said surface being constructed and arranged so that a plurality of individual items to be glued are made to roll on said surface over said slit, and (d) means for intermittently feeding items to be glued to said glue applicator.*

*18. A glue applicator according to claim 17 wherein the storage tank is connected to a glue reservoir in which glue collected by said storage tank is re-introduced for subsequent feeding into the tubular container.*

*19. A glue applicator according to claim 18 wherein said glue reservoir is disposed at such a level that glue is caused to flow out through the slit due to a difference in height between the slit and level of glue inside the glue reservoir.*

*20. A glue applicator according to claim 18 wherein pumping means is arranged between said storage tank and said glue reservoir, or between said glue reservoir and said tubular container, for recirculating said glue.*

*21. A glue applicator according to any one of claims 17, 18, 19 or 20 further comprising a means for vertically repositioning the tubular container.*

*22. A glue applicator according to any one of claims 17, 18, 19 or 20 further comprising a means for adjusting width of the slit from which glue is fed.*

*23. A glue applicator according to any one of claims 17, 18, 19 or 20 wherein said slit is defined by a pair of inclined plates delimiting a wedge-shaped spout.*

*24. A glue applicator according to claim 23 wherein said pair of inclined plates are movable one with respect to another to adjust width of said slit.*

*25. An apparatus for gluing a tail end of a web of material forming a log including:*

*(a) a log loading wheel;*

*(b) a pair of rollers for unwinding the tail end of said web of material;*

(*c*) *a vacuum source for attracting said tail end of said web of material as said tail end is unwound from said log;*

(*d*) *surface upon which said log rolls, said surface having a slot through which glue is applied to said log as said log rolls over said slot; and*

(*e*) *a glue reservoir having a dispensing area adjoining said surface upon which said log rolls, said dispensing area being constructed and arranged so that said glue is applied to said log when said log rolls over said slot.*

* * * * *